(12) United States Patent
Knibbeler et al.

(10) Patent No.: US 8,276,209 B2
(45) Date of Patent: Sep. 25, 2012

(54) PROXIMITY CHECK SERVER

(75) Inventors: Charles Leonardus Corenlius Maria Knibbeler, Eindhoven (NL); Antonius Adriaan Maria Staring, Eindhoven (NL); Menno Anne Treffers, Eindhoven (NL); Emmanuel David Lucas Michael Frimout, Eindhoven (NL); Johannes Arnoldus Cornelis Bernsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 819 days.

(21) Appl. No.: 11/575,314

(22) PCT Filed: Sep. 5, 2005

(86) PCT No.: PCT/IB2005/052890
§ 371 (c)(1),
(2), (4) Date: Mar. 15, 2007

(87) PCT Pub. No.: WO2006/030341
PCT Pub. Date: Mar. 23, 2006

(65) Prior Publication Data
US 2008/0250147 A1    Oct. 9, 2008

(30) Foreign Application Priority Data
Sep. 17, 2004  (EP) .................................... 04104516

(51) Int. Cl.
*G06F 7/04* (2006.01)
(52) U.S. Cl. ............ 726/30; 709/51; 709/227; 709/229; 713/168; 726/33; 726/26; 726/5
(58) Field of Classification Search .................. 726/30
See application file for complete search history.

(56) References Cited

U.S. PATENT DOCUMENTS

| | | | |
|---|---|---|---|
| 7,042,867 B2* | 5/2006 | Whitehill et al. | 370/338 |
| 7,079,851 B2* | 7/2006 | Makuta | 455/456.3 |
| 7,398,392 B2* | 7/2008 | Weber | 713/168 |
| 7,418,511 B2* | 8/2008 | Takechi et al. | 709/229 |
| 7,509,131 B2* | 3/2009 | Krumm et al. | 455/456.1 |
| 7,697,437 B2* | 4/2010 | Shin et al. | 370/238 |

(Continued)

FOREIGN PATENT DOCUMENTS

EP    1304893 A1    4/2003

(Continued)

OTHER PUBLICATIONS

"Digital Transmission Content Protection Specification", vol. 1, Revision 1.3, http://www.dtcp.com/data/info_20040107_dtcp_Vol_1_lp3.pdf).

(Continued)

*Primary Examiner* — Jeffrey D Popham
*Assistant Examiner* — Gary Gracia

(57) ABSTRACT

A method and system for determining the level of allowed communication between devices. By addition of one or more tamper-resistant proximity check server(s), round-trip time measurements to estimate the distance between the communication devices are performed in order to determine the amount of communication allowed between these devices. In one embodiment, a single tamper-resistant proximity server computes the distance between communication devices that are implemented as trusted applications on open platforms.

30 Claims, 8 Drawing Sheets

U.S. PATENT DOCUMENTS

| | | | |
|---|---|---|---|
| 7,836,507 B2 * | 11/2010 | Ono et al. | 726/26 |
| 7,849,173 B1 * | 12/2010 | Uhlik | 709/223 |
| 2003/0041110 A1 * | 2/2003 | Wenocur et al. | 709/206 |
| 2003/0126464 A1 * | 7/2003 | McDaniel et al. | 713/201 |
| 2004/0009778 A1 | 1/2004 | Makuta | |
| 2004/0028017 A1 | 2/2004 | Whitehill et al. | |
| 2004/0098583 A1 | 5/2004 | Weber | |
| 2004/0103303 A1 * | 5/2004 | Yamauchi et al. | 713/200 |
| 2004/0107252 A1 * | 6/2004 | Futa et al. | 709/204 |
| 2004/0109417 A1 * | 6/2004 | Castro et al. | 370/238 |
| 2004/0184478 A1 * | 9/2004 | Donescu et al. | 370/462 |
| 2005/0003814 A1 * | 1/2005 | Saito et al. | 455/435.1 |
| 2005/0027984 A1 * | 2/2005 | Saito et al. | 713/168 |
| 2005/0210290 A1 * | 9/2005 | Ono et al. | 713/201 |

FOREIGN PATENT DOCUMENTS

| | | |
|---|---|---|
| FR | 2851866 | 9/2004 |
| WO | 03003687 | 1/2003 |
| WO | 03079638 | 9/2003 |
| WO | 2004014037 A1 | 2/2004 |
| WO | 2004030311 A1 | 4/2004 |
| WO | 2004030312 | 4/2004 |

OTHER PUBLICATIONS

S. Capkun and Jean-Pierre Hubaux: "Secure Positioning in Sensor Networks", http://www.terminodes.org/getDoc.php?docid=692&docnum=1.

* cited by examiner

PROXIMITY CHECK SERVER

The invention relates to a method for determining the level of allowed communication between a first device and a second device. The invention further relates to a proximity check server for enabling determination of allowed level of communication between a first device and a second device. The invention also relates to a system comprising a first device and a second device connected with a network. The invention further relates to a computer program product, for enabling determination of allowed level of communication between a first device and a second device, for use with a proximity check server. The invention also relates to a computer program product, for enabling determination of allowed level of communication between a first device and a second device, for use with the first device.

Secure Authenticated Channels (SACs) are commonly used to protect digital content that is in transit from one device to another, e.g. in a home network. An example of a SAC is DTCP (Digital Transmission Content Protection specification, Volume 1 (informational Version), revision 1.3, Jan. 7, 2004, available from http://www.dtcp.com/data/info_20040107_dtcp_Vol_1_1p3.pdf) as specified for an IEEE 1394 connection between, e.g., a set-top box and a digital television. In this example, the geographical extent of the SAC is limited by the maximum allowable cable length. Such physical constraints are not present when using the Internet Protocol (IP) as the underlying transport mechanism between the devices. However, content providers generally still require close proximity of the devices involved. The reason is that this would prevent sharing of content between multiple households, since devices that are in close proximity are more likely to belong to a single home network.

In a different setting, and on a different scale, broadcasters require that broadcast content may be shared between users in a target area, but not be distributed from those users to users outside the target area. For example, content should be limited to a single country for which a copyright license has been paid, or content should be limited to the footprint of a satellite. This could be achieved to a certain extent by limiting the distance between users that are allowed to exchange content.

International patent application WO2004014037 describes a method for a first communication device performing authenticated distance measurement between the first communication device and a second communication device, wherein the first and the second communication device share a common secret and the common secret is used for performing the distance measurement between the first and the second communication device.

Measurements of the time duration between transmission of a query and the receipt of the response (round-trip, RTT) are reliable only if the measuring device has a secure notion of time. In closed systems, such as CE devices, this usually is not a problem. However, in open systems, such as a PC running Windows or Linux, this may be difficult to achieve. The reason is that trusted applications (applications that contain the secret(s) needed to establish a SAC) running on such systems generally do not have access to a secure clock. The trusted application runs on an open operating system, which enables a hacker to insert a "clock-spoofing" driver, or modify the system clock in the operating system, which reports the "wall-clock" time or the real-time clock to the software. Spoofing this clock could result in a system clock value being modified (for example: slowed down) at will in order to influence the distance measurement.

It is an object of this invention to provide a method described in the preamble that allows applications running on an open system access to reliably generated information about the locations of and/or relative distance between the two devices in order to determine the level of allowed communication between the communication devices running the applications.

This object is achieved by a method comprising the steps of—a first proximity check server performing a communication protocol with the first device to reliably determine a first distance between the first proximity check server and the first device, —a second proximity check server performing a communication protocol with the second device to reliably determine a second distance between the second proximity check server and the second device, —determining whether the first determined distance and second determined distance satisfy a predetermined rule, and—determining the level of allowed communication between the first device and the second device.

According to the invention, one or more so-called Proximity Check Servers (PCS's) perform authenticated distance measurements. Each PCS must be able to perform these measurements reliably and must therefore be tamper-resistant. A tamper resistant device is a device performing operations where the functionality of these operations cannot be changed by ordinary users using readily available tools and techniques, such as for example, screw drivers, wire cutters, soldering irons, or by installing or modifying application software or software drivers on a programmable device. For achieving tamper-resistance, the PCS may contain a closed, hardware based sub-system. As such, the PCS may be a stand-alone device that is directly connected to the home network. Alternatively, the PCS may be a trusted subsystem of some other device such as a router or network interface module. In yet another embodiment, the PCS may consist of a dongle (USB, RS232, parallel port), which contains the trusted hardware part, and appropriate driver software.

Now, if two devices on the home network wish to establish a geographically localized SAC, then the PCS('s) measure(s) the distance to each of the two devices. When a single PCS operates both as the first PCS and as the second PCS, it performs both of the distance measurements, and the distance between the PCS's is known (and implicitly authenticated) to be zero. Subsequently, it is determined whether the first determined distance and second determined distance satisfy a predetermined rule. As a first example of a possible rule, in the case of a single PCS that has produced both the first distance and second distance measurements, the rule could be that the sum of the first determined distance and second determined distance remains below a predetermined threshold. Therefore the devices can be considered close enough in order to allow them for example to exchange digital content. Accordingly, the maximum distance between the first device and second device can never be more than this threshold, such as for example a system-wide constant or a value contained in the content to be communicated. As a second example of a rule, also in the case of a single PCS, both the first determined distance and second determined distance should be below a threshold. In this case, both the first device and the second device are restricted to a circular area around the PCS. As a third example of a rule, in the case of two different PCS's the sum of the first determined distance and the second determined distance and the known distance between the PCS's should be below a threshold. As a fourth example of a rule, also in the case of two different PCS's at known or strategically chosen locations, the first determined distance and the second determined distance should each be below a threshold. In this example the rule verifies whether both the first device and the second device are within a circular region around the respective PCS's that performed the distance measurements.

The communication protocol is preferably a challenge response protocol such that only the first device or second device itself is able to provide the response to the challenge.

As an additional advantage, this object can be achieved without modifying existing networking hardware and software. Only a PCS needs to be added to an existing network.

This invention can be used in for example the fields of Home Networks and Authorized Domains, as well as in (partially more remote and larger) distributed networks.

In one embodiment, the distance measurements are round-trip time measurements. From these round-trip time measurements, the distances are estimated, and preferably also authenticated. However, instead of estimating the first distance and the second distance based on the round-trip-times, the round-trip-times can also be used directly as a measure for the first and second distance.

In another embodiment, there is only one proximity check server, such that the first proximity check server and the second proximity check server are one and the same. The proximity check server determines both the distance to the first device and to the second device. As the same proximity check server is used for both measurements, the distances can for example be summed in order to achieve an upper bound for the distance between the devices, or the distances can be used to determine whether both devices are within a limited distance to the proximity check server.

In another embodiment, only if a sum of the first determined distance and the second determined distance and a distance between the proximity check servers is below a predetermined threshold, the devices are considered close enough in order to allow them to communicate at a certain level. If the first and the second proximity check server are the same (as described in claim 3), then the distance between the first and the second proximity check server is zero.

In another embodiment, instead of the sum of the distances, each of the distances should be below respective predetermined thresholds. These thresholds determine the target area(s) around the proximity check server(s) within which the devices are allowed to communicate with each other. Preferably, for optimal protection, the proximity check server(s) is (are) located near the center of the geographically region (or region parts) within which devices are allowed to exchange content. The target area can be a limited region formed to match a satellite footprint or a specific jurisdiction.

In another embodiment, multiple proximity check servers can be used to increase the measuring accuracy. First, it is possible to measure the distance of a device to the nearest proximity check server, which may result in a more accurate measurement. Additionally, this allows the region in which the communication between devices is allowed to be of a shape differently than a simple circle. The more servers are added, the more complex the shape of the target area can be. If different proximity check servers are used to measure the distance to the first device and to the second device, the total distance is increased with the (known) distance between the different proximity check servers.

Second, it is possible to use additional proximity check servers to more accurately determine the location of either the first device or the second device, by performing multiple distance measurements between different proximity check servers and the same device to which the distance is to be measured, thereby more accurately determining the location of the device.

In another embodiment, if the proximity check server is located in for example a wireless network access point, a phone switch point, or a cable distribution station, the method allows choosing the location of the proximity check server such that a specific set of users (for example specific neighborhoods or towns) are part of the target area.

In another embodiment, by integrating the round-trip time measurement with the authentication protocol, it is more difficult to spoof the proximity check server, and the first device can be sure that the PCS has authorization to perform a proximity measurement. The first device has authenticated access to the unique identifier of the PCS.

According to another this embodiment, the proximity check server operates as a proximity certificate server and generates a first proximity certificate for each distance measured. A Proximity Certificate is a data structure that contains, among others information on the distance or round-trip time between a specific device and the PCS, and a cryptographic signature that can be used to determine that the message is authentic and has not been tampered with. This cryptographic signature can for example use a symmetric cipher or public key cryptography.

In another implementation, each device retrieves its respective proximity certificate from the proximity check server, after which the devices can exchange these proximity certificates. By applying the predetermined rule on the distances retrieved from these proximity certificates the level of allowed communication between the respective devices can be obtained. This can be done symmetrically (at both devices) or only by one device (preferably the device which has the highest interest in guarding the protection of content). In this embodiment, the PCS needs only to perform the distance measurement upon request and the PCS is therefore easy to implement and low-cost.

In another implementation, the second device retrieves both proximity certificates from the proximity check servers. By applying the predetermined rule on the distances retrieved from these proximity certificates the level of allowed communication between the respective devices can be obtained.

After a device requests a proximity certificate, it is up to the proximity check server to send a proximity certificate. The proximity check server can send either the already locally available proximity check or it can generate a new proximity certificate, depending on for example whether the request explicitly or implicitly requires a new certificate, or depending on whether a proximity certificate has been generated recently.

According to another embodiment, in order to make sure the proximity certificate still has a valid meaning, the time of the distance measurements is included in the proximity certificate.

In another embodiment, the first device inserts a random number in the proximity certificate request, and the proximity check server subsequently signs a proximity certificate that comprises the random number of the proximity certificate request. This random number in the proximity certificate allows the first device to verify whether the proximity certificate was indeed created after the request was made.

According to another embodiment, the proximity check server operates as a distance certificate server and generates a distance certificate for the distance between the first device and the second device. A Distance Certificate is a data structure that contains, among others, information on the distance between two specific devices, and a cryptographic signature that can be used to determine that the message is authentic and has not been tampered with. This cryptographic signature can for example use a symmetric cipher or public key cryptography. The first determined distance and second determined distance are used by the proximity check server to compute the distance between the devices. This certificate can be retrieved by any or both of the two devices in order to verify whether the other device is sufficiently close.

In another implementation, either the first or second device or both requests the distance certificate for the distance between the first and second device from the proximity check server. If the distance certificate is not already available at the proximity check server, or if it is no longer valid, the proximity check server will perform the necessary measurements and will generate the distance certificate, after which the distance certificate can be retrieved by the requesting device(s). Subsequently, the distance can be compared to a predetermined threshold in order to decide to which extent the communication between the first and second device is allowed.

In another implementation, either the first or second device (or both) requests the proximity check server to verify the distance between the first device and the second device. This has the advantage that the devices have only limited knowledge about the exact distance between the devices. They only know whether they are within the allowed range. The answer can be regarded as a distance certificate that specifies only whether the distance is below the predetermined threshold.

According to another embodiment, in order to make sure the distance certificate still has a valid meaning, the time of the distance measurements is included in the distance certificate.

In another embodiment, the first device inserts a random number in the distance certificate request, and the proximity check server subsequently signs a distance certificate that comprises the random number of the distance certificate request. This random number in the distance certificate allows the first device to verify whether the distance certificate was indeed created after the request was made.

According to another implementation, a wireless communication link with a limited reach is used by the proximity check server, such that only local devices within the reach of the wireless communication (or devices directly connected to such a local device) will be able to obtain a proximity certificate or distance certificate. To strengthen the proximity check it is preferred that a different distance measurement such as a round-trip time measurement is also performed.

In another embodiment, the proximity check server participates in the setup of secure connections between devices, which is done only after the distances of the devices to the proximity check server(s) are measured and if it is determined by the proximity check server that the prospective distances satisfy the predetermined rule.

It is a further object of this invention to provide a proximity check server, that allows applications running on open platform devices access to reliably generated information about the locations of and/or relative distance between the two devices in order to determine the level of allowed communication between the communication devices running the applications.

This further object is achieved by a proximity check server according to the invention, comprising—transmitting means being arranged to transmit messages during a communication protocol (200) with at least one of the first device and the second device, —receiving means being arranged to receive messages during the communication protocol, —tamper resistant processing means being arranged to execute the communication protocol, —tamper-resistant measuring means being arranged to measure a distance while executing the communication protocol, —tamper resistant processing means further being arranged to generate at least one of a distance certificate and a proximity certificate, and—tamper resistant signing means arranged to cryptographically sign at least one of the distance certificate and the proximity certificate.

The processing means according to the invention either contain the means for estimating the distance to the first device and to the second device to which the distance is measured, and subsequently generating and signing the distance certificate, or the processing means contain means for estimating the distance to the first device and subsequently generating and signing the proximity certificate.

According to another implementation, the proximity check server further comprises means for converting the round-trip time to a distance estimate.

According to another implementation, the proximity check server is integrated in a network device, which can for example be a network router or a network interface module.

According to another implementation, the proximity check server is implemented in a tamper-resistant module, commonly known as dongle, which can be connected to a system using common interfaces such as for example USB, RS232, parallel port, bluetooth, 802.11, or IRDA.

The invention is further characterized by a system according to the invention, the system further comprising a tamper resistant proximity check server, connected with a network, wherein the proximity check server is arranged to verify the distances to the first and the second device using the method.

A further implementation of the system according to the invention is described in claim 26. Either the first device or the second device (or both) can be a software implementation running on an open system, such as a computer running a standard operating system.

The invention is further characterized by computer program products according to claims 27-30.

Figure 4A:
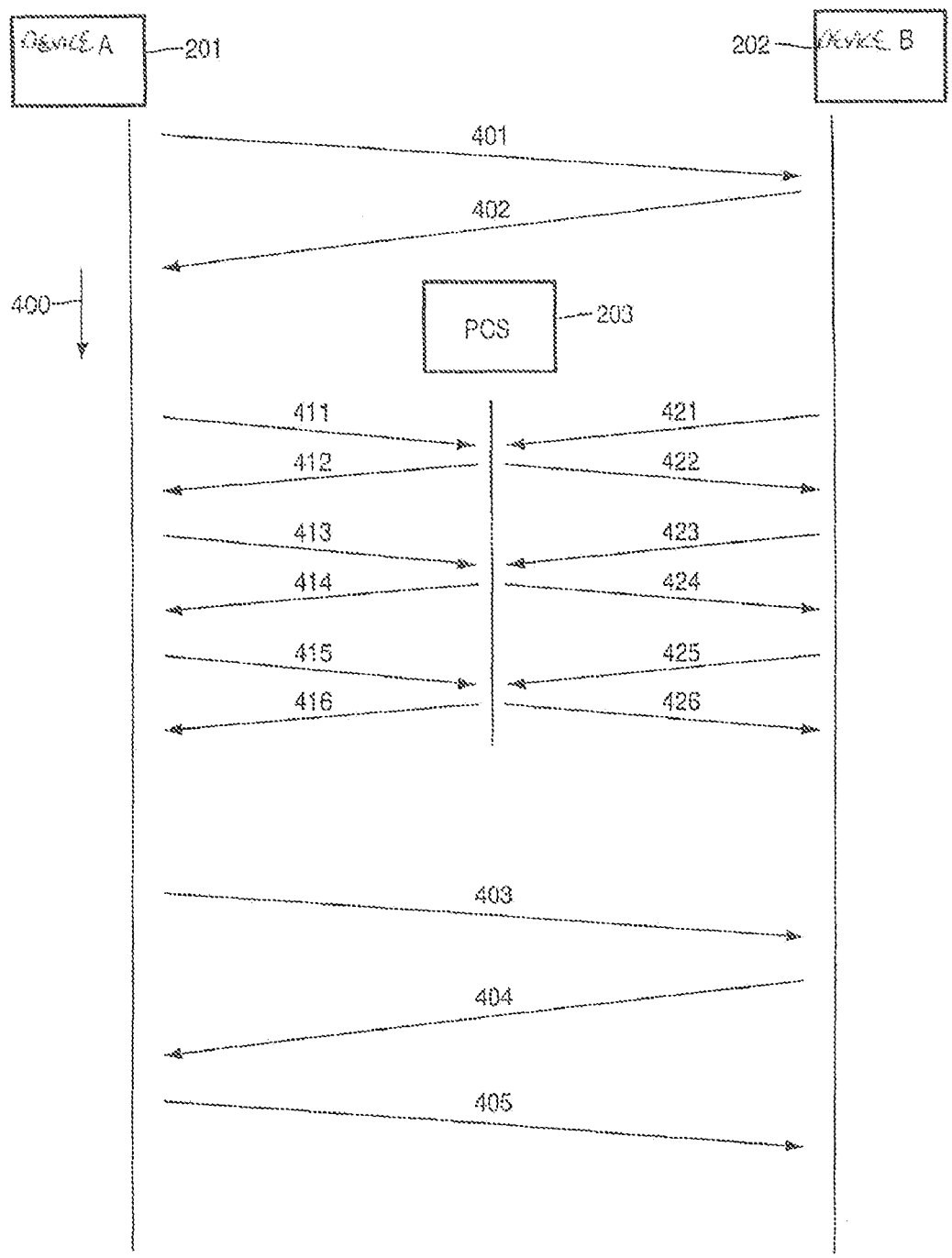
Figure 4B:
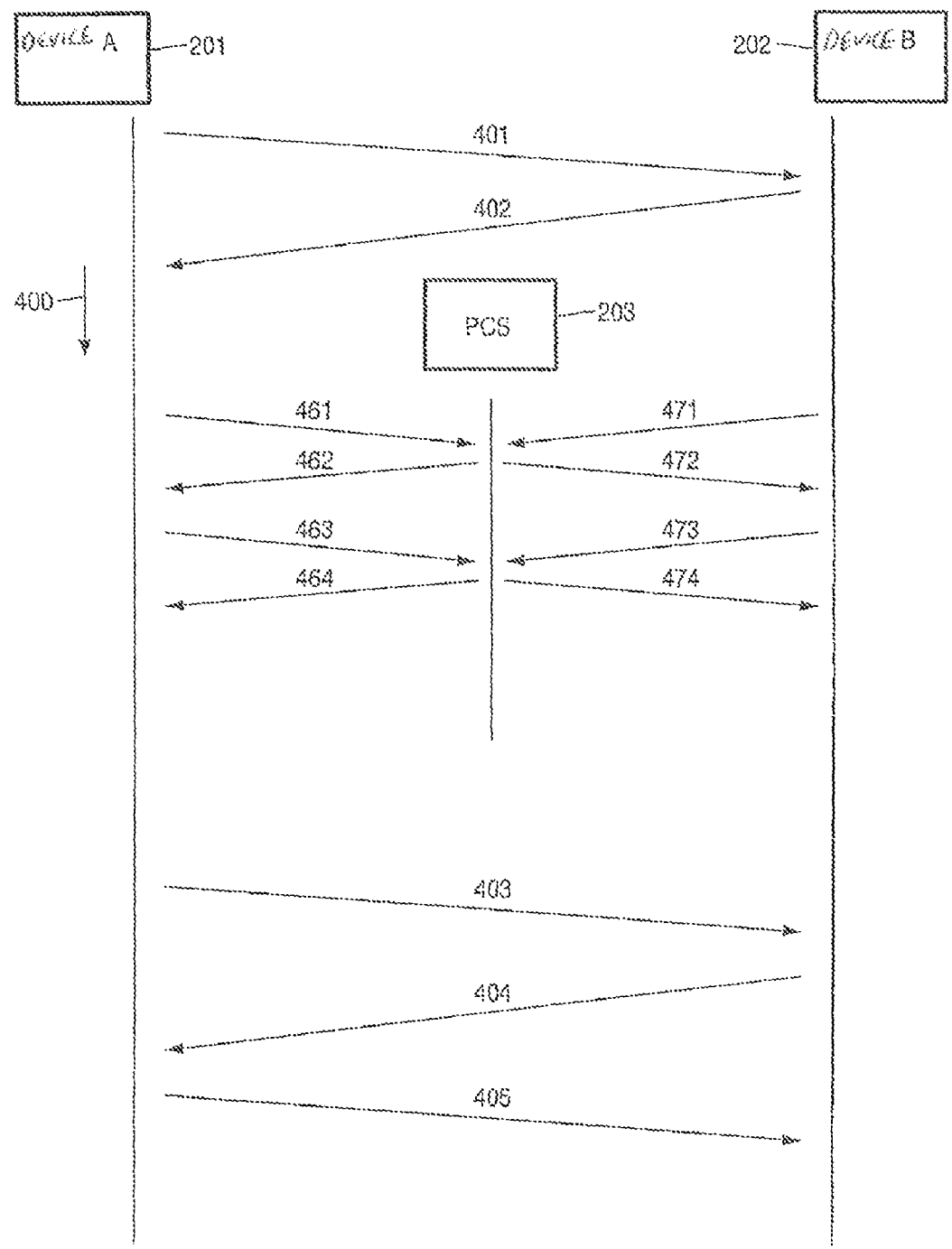
Figure 5:
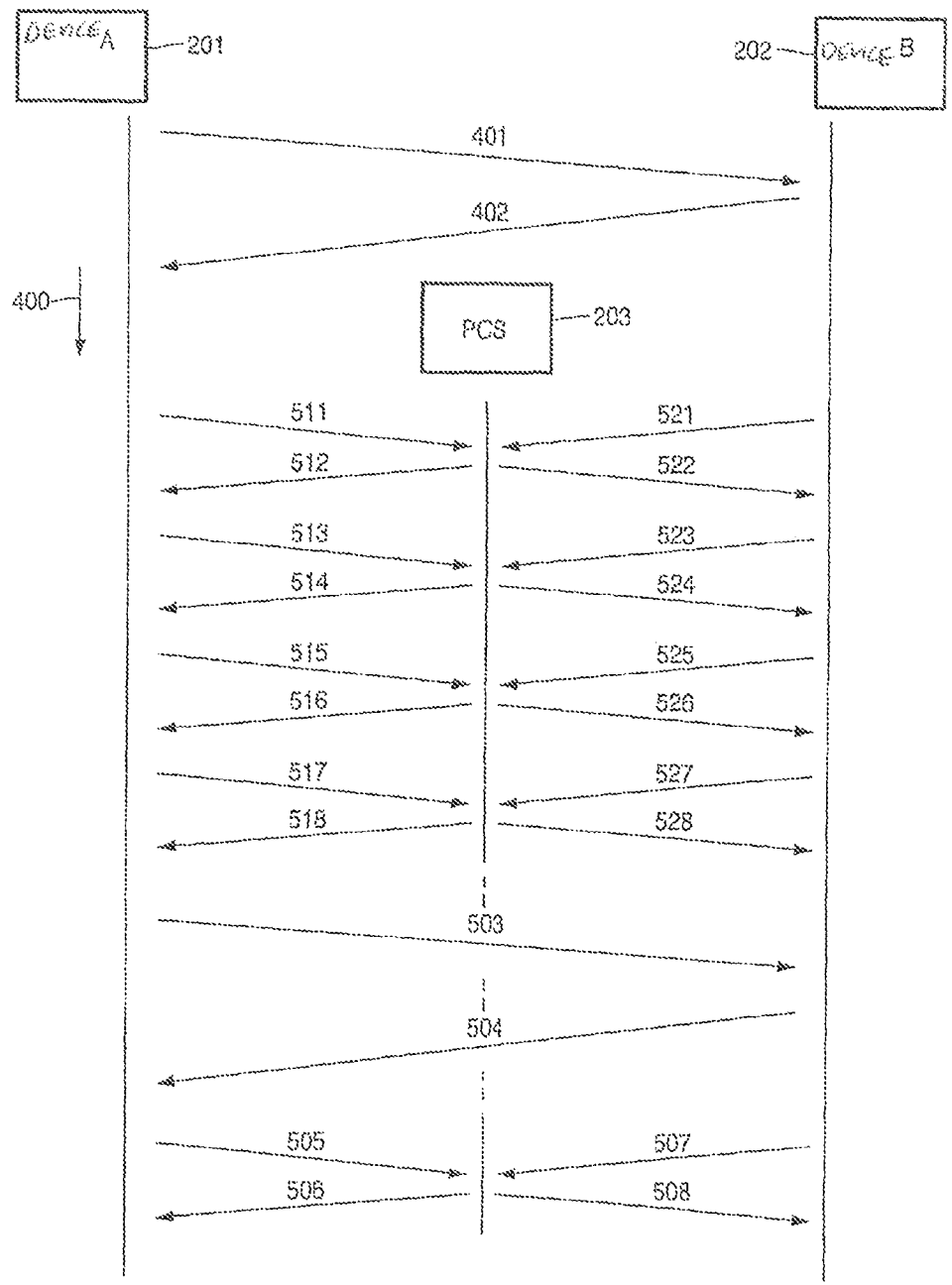
Figure 6:
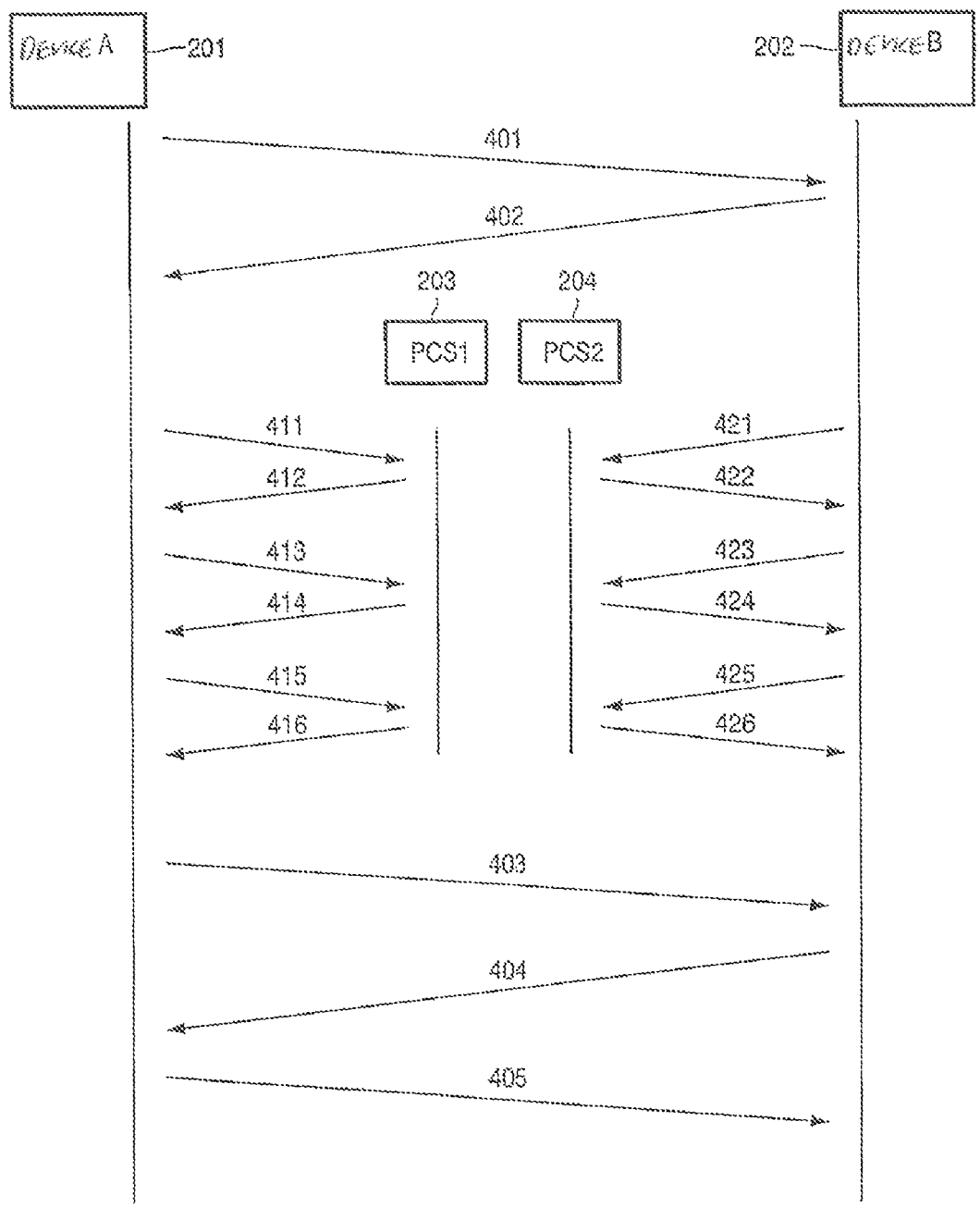
Figure 7:
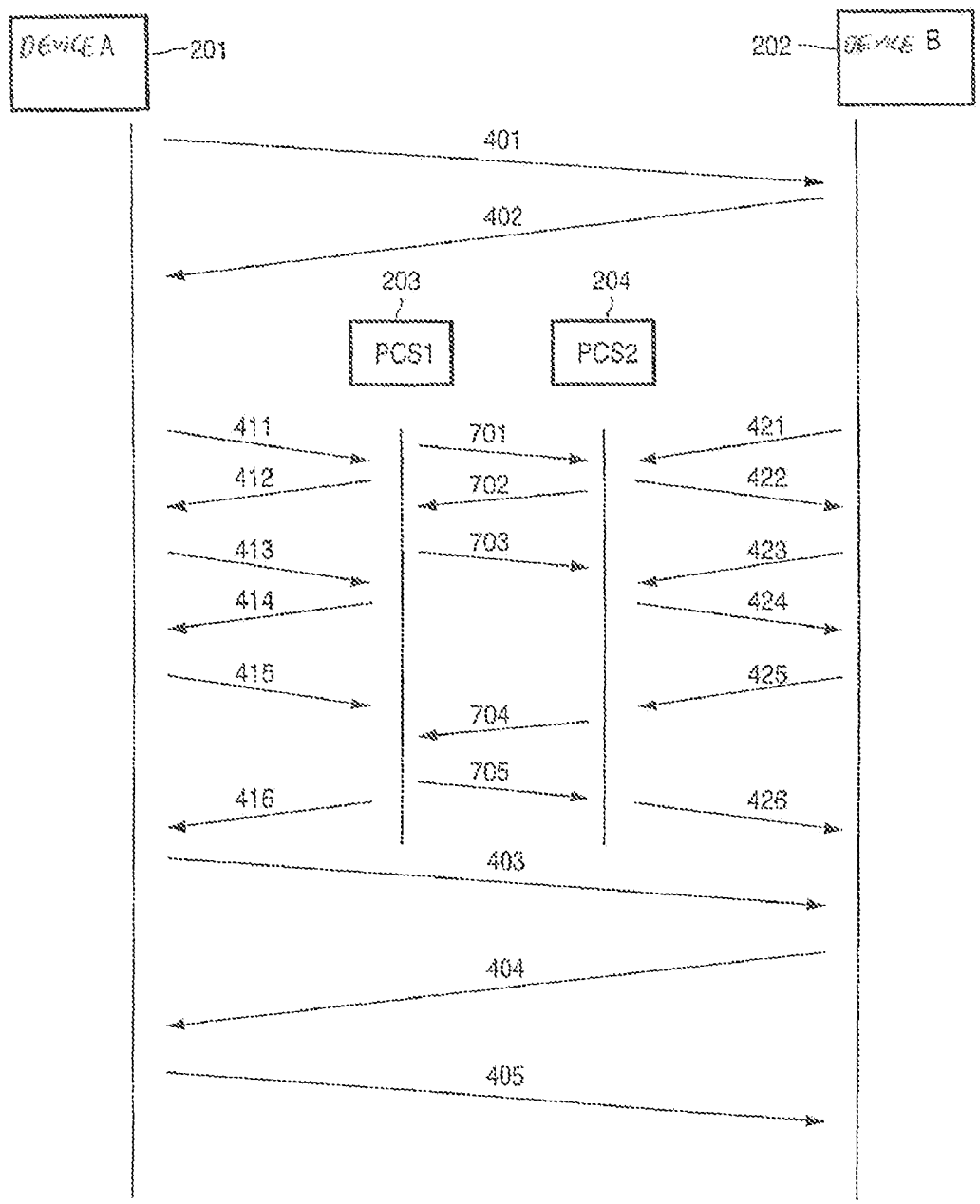

FIG. 4 illustrates a first example of a SAC establishment protocol comprising a round-trip time measurement protocol to generate a proximity certificate, FIG. 5 illustrates a second example of a SAC establishment protocol comprising a round-trip time measurement protocol to generate a proximity certificate, FIG. 6 illustrates an example of a SAC establishment protocol comprising different PCS's, and FIG. 7 illustrates an example of a SAC establishment protocol comprising a PCS generating a distance certificate.

Figure 1:
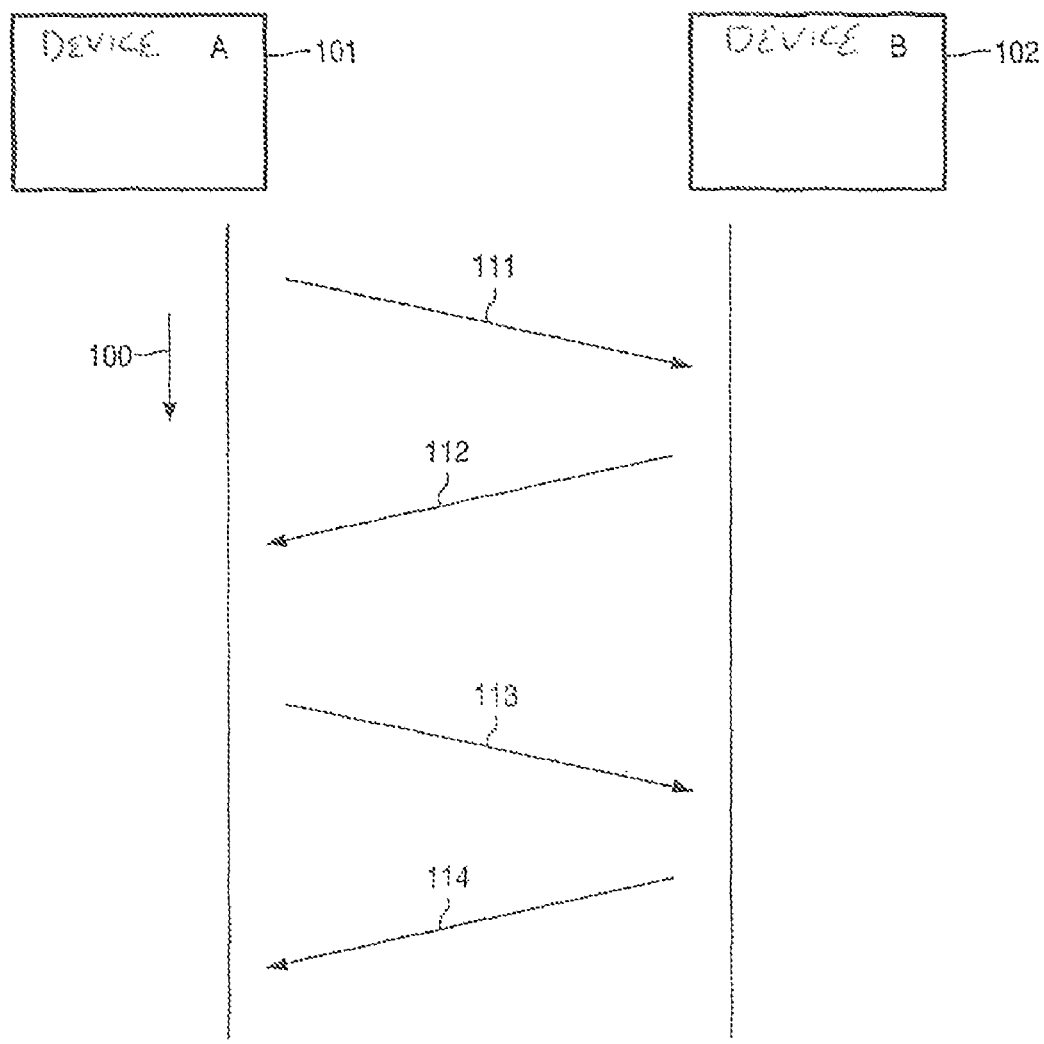
FIG. 1 illustrates a state of the art SAC-protocol.

FIG. 1 illustrates a state of the art secure authenticated channel (SAC) protocol, along the timeline 100 between a first device (device A) 101 and a second device (device B) 102. Device A and device B each have a device certificate $Cert_X$ ($X=A, B$), which vouches for the devices' identity $ID_X$ and public key $K_{pub,X}$ through the Key Issuance Center (KIC) signature. In addition, the devices each contain the private key that is associated with their certified public key. In steps 111 and 112 the devices exchange their certificates and random numbers. In an example implementation, device A communicates in step 111 to device B a certificate $Cert_A=sign_{KIC}(ID_A\|K_{pub,A})$ and a random number $R_A$. Similarly, device B communicates in step 112 to device A a certificate $Cert_B=sign_{KIC}(ID_B\|K_{pub,B})$ and a random number $R_B$. The communication steps 111 and 112 may occur in any order or even overlap. After verification of the signatures of the certificates, the devices exchange responses in step 113 and 114 (which may also occur in any order or overlap). Device A communicates in step 113 to device B the response $sign_A$ ($R_B$||$K_{pub,B}(K_A)$), where $K_A$ is a session key contribution from device A. In the response $K_{pub,B}(K_A)$, $K_A$ is encrypted with the public key of device B. A similar communication occurs in the reverse direction from device B to device A in step 114. Subsequently, both devices verify the signatures and responses, and calculate a SAC key from the key contributions $K_A$ and $K_B$.

Figure 2:
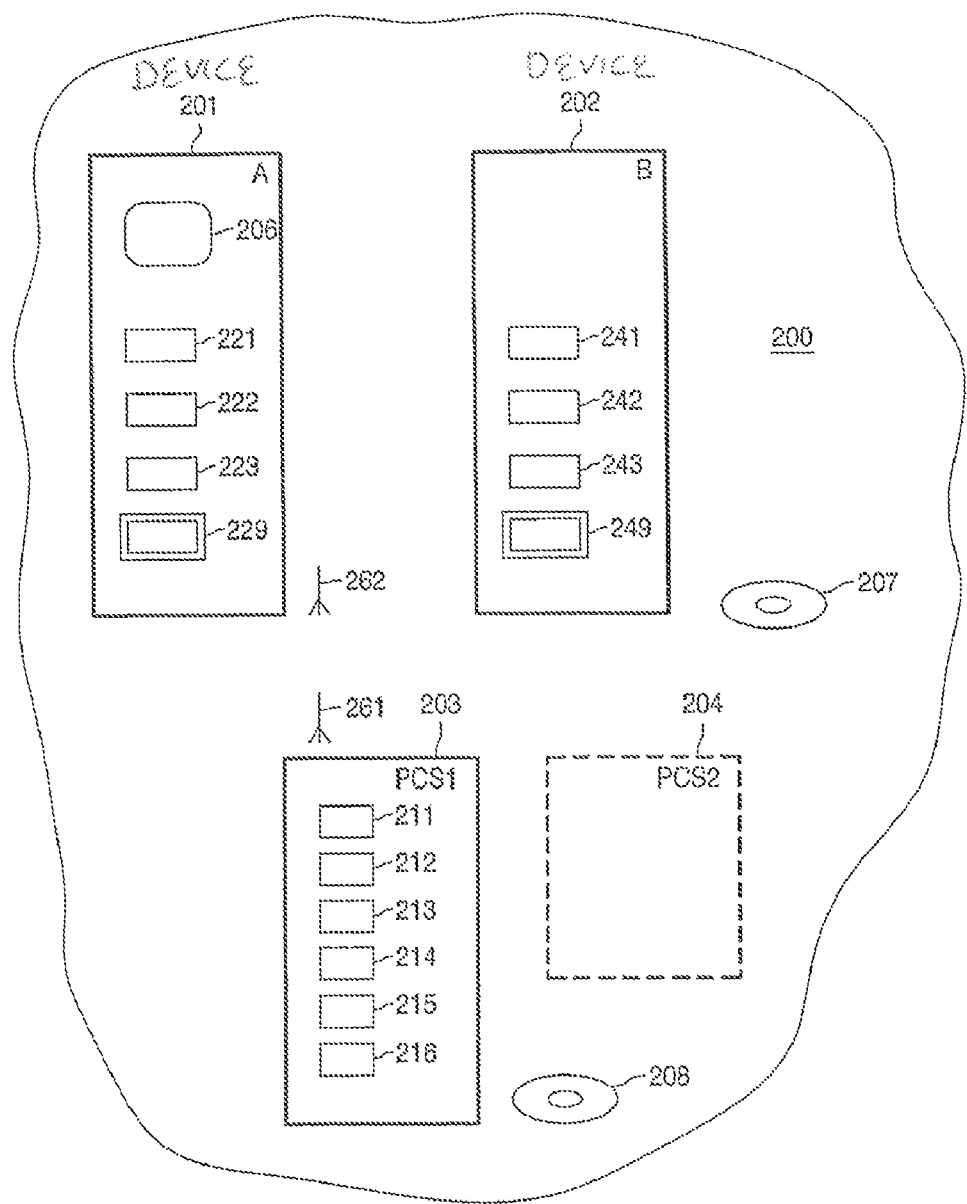
FIG. 2 illustrates a first embodiment of the invention.

A first embodiment of the invention is illustrated in FIG. 2. Different devices communicate within a network environment 200. In this embodiment a trusted application 206 runs on a first device (device A) 201, and aims to set up a SAC with a second device (device B) 202. Device A and device B comprise transmitting means 221/241, receiving means 222/242, processing means 223/243, etc. Some kind of service discovery protocol may connect device A and B, either of which may act as the initiator. Before setting up a communication channel with device B, the trusted application on device A wants to verify whether device B is within a predetermined maximum distance from the device A, in order to make sure that it belongs to the same home network, before it decides that it is willing to perform a certain action such as to share content.

If the trusted application runs on a device that has an open architecture, it cannot reliably use its system clock to reliably determine the distance. Instead, in order to reliably determine the distance, a tamper-resistant proximity check server (PCS) 203 is used to perform two round-trip time measurements between the PCS and respectively device A and device B. The distance between device A and device B is estimated using the measurements.

The PCS 203 comprises transmitting means 211, receiving means 212, processing means 213, tamper-resistant measuring means 214, estimation means 215, and signing means 216. A computer program product in the form of a non-transitory computer-readable storage medium 207 and 208 may carry instructions that, when loaded, cause a programmable device in device 202 and 203 respectively to execute the steps necessary to implement the method according to the invention.

The content to be protected by the method according to the invention can be audio or video content, but can also be applied to other types of content such as user profiles, text documents, webcam images (for example near the porch or within the home environment), intelligent home monitoring and control services, etc.

All entities involved in the protocols, viz. device A and B and the PCS may conveniently use the RSA public key crypto system. All signatures may give message recovery, and may be created following ISO/IEC 9796-2:1997(E). Public key encryption may be performed following PKCS #1 v2.1, section 7.2. Encryption could also be performed following PKCS #1 v2.1, section 7.1 (RSAES-OAEP). The authentication & key exchange part of the protocols may follow ISO/IEC 11770-3:1999(E), section 7.6.

It is possible to further protect the PCS in order to enable device A and B to verify the integrity and authenticity of the PCS, by implementing a Physical Uncloneable Function (PUF). A PUF is a function that is realised by a physical system 229/249, such that the function is easy to evaluate but the physical system is hard to characterize.

Preferably, device A and B ensure that their Revocation & Authorization Information (RAI) is up-to-date (e.g. by synchronizing the RAI with each other, or with some other service on the network). The RAI is a data structure (e.g. a list) that identifies devices and PCSs, that are authorized to participate in a secure link, and that identifies devices that have been revoked. Revocation and authorization lists can be distributed to device A and device B through physical distribution media such as optical disks, by (public) broadcasts, and by other means. In addition, two communicating devices may exchange their RAI. Both device A and device B preferably check each certificate against the RAI before accepting further communication. The PCS is preferably not involved in this process in order to keep the cost low.

Experimental results (depicted in FIG. 3) show that a threshold 301 exists that distinguishes between the round-trip times for devices within a home network, and the round-trip times between devices that are not both within the same home network.

The round-trip times are determined by a number of factors, including the physical length of the transmission, and the number of intermediate hops and routers in the connection.

For a short-distance connection, the hops and routers are the main contributing factor to the round-trip time and the round-trip time forms a good estimate for the length of the connection.

Figure 3:
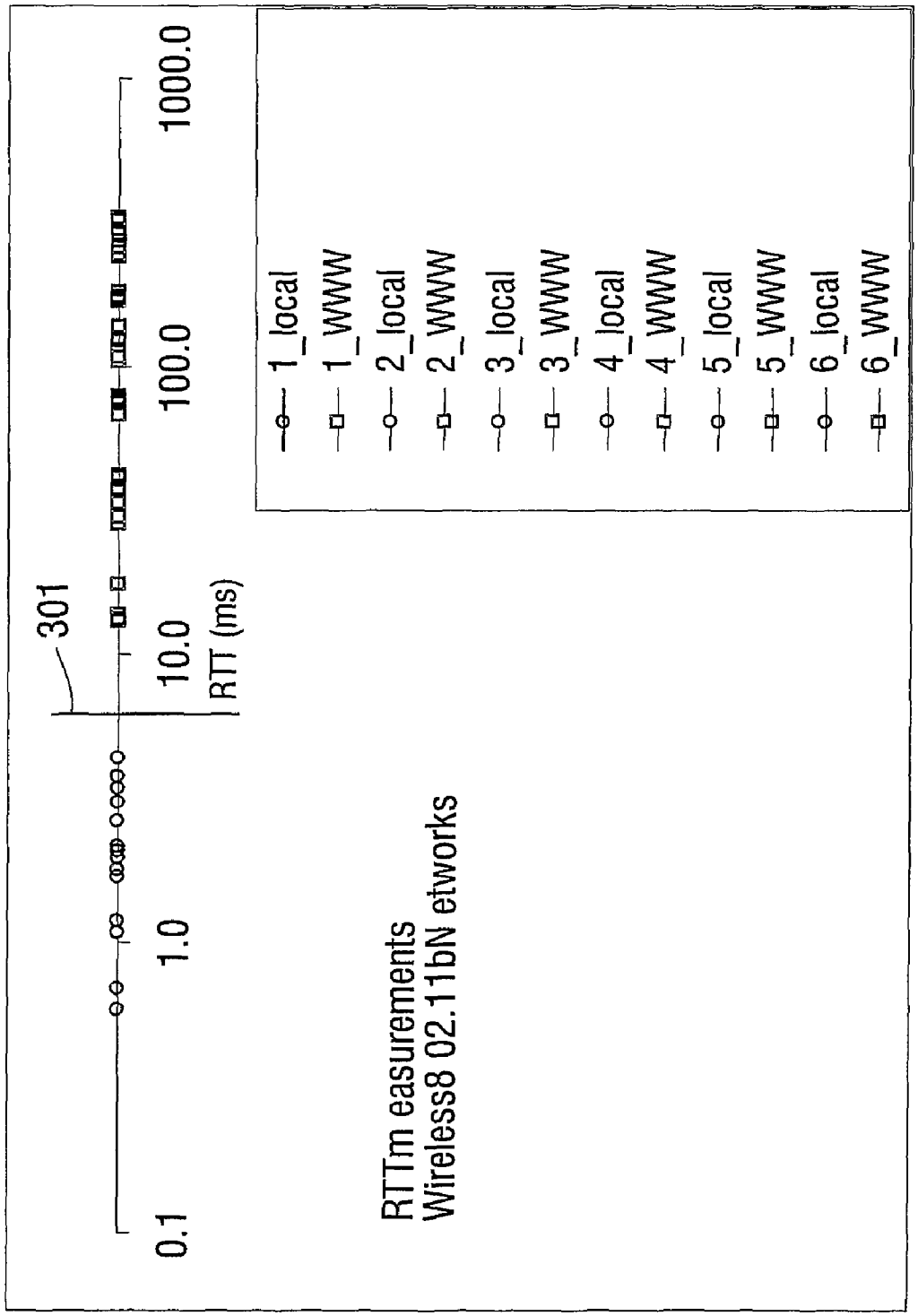
FIG. 3 shows round-trip time measurements.

With increasing distance between the PCS and the first device, also the length of the transmission link and the number of network elements (routers, modems, network interfaces, hubs, switches etc) increase. These effects will cause an increasing round-trip-time. As an example, FIG. 3 shows that RTT measurements can be used to clearly distinguish between links within a local network and links from a local network node to a node outside the local network.

Although the round-trip times measured for short distance connections are mainly due to the delay of the routers, it is nevertheless possible to use the round-trip time as a measure to distinguish between in-home and out-of-home connections. Experiments have shown that local network delays are approximately 0.1 ms per router step, whereas a WAN link to an external network introduces at least 10 ms delay. Even a local WiFi link adds only approximately 3 ms delay. Hence, there is a clear distinction between delays of communications within the network and delays of communications with devices outside the local network. Only if the home network has a high network load, the round-trip time between devices within the home network may increase beyond the threshold. Thus in the case of a high network load, the verification may fail, but in that case content sharing wouldn't be possible or desirable anyway.

FIG. 4A illustrates a first embodiment of the SAC-protocol comprising round-trip time measurements. Device A 201 and device B 202 and the PCS 203 each have a device certificate $Cert_X$ (X=A, B, PCS), which vouches for the device's identity $ID_X$ and public key $K_{pub,X}$ through the Key Issuance Center (KIC) signature. In addition, the devices each contain the private key that is associated with their certified public key. In this first embodiment only public key cryptography is used.

Timeline 400 shows the communications between these devices. Device A selects, possibly through the use of its RAI, a PCS and initiates a secure link establishment protocol. For this purpose, device A transmits in communication step 401 its device certificate $Cert_A$ and the identity $ID_{PCS}$ of the PCS of its choice to device B. The certificate may look like $Cert_A=sign_{KIC}(ID_A||K_{pub,A}||\ldots)$. In response, device B transmits its own certificate in step 402, and preferably confirms the PCS identity.

Both device A and device B verify that the received certificate has a valid KIC signature. If either signature is false, A and/or B may decide to abort the protocol. In addition, A may ensure that B is authorized to participate in the secure link. For that purpose, A uses its RAI to verify that B is authorized. If B is not authorized, A aborts the protocol.

In order to initiate the Round-Trip Time (RTT) measurement protocol, device A transmits in communication step 411 its certificate $\text{Cert}_A$, to identify itself to the PCS. The communication comprises preferably a random number $N_A$ (nonce), and optionally the requested number $M_A$ of measurements to the identified PCS. The nonce allows verification of freshness of the measurement results in the proximity certificate.

Subsequently, the PCS verifies that the received certificate has a valid KIC signature, so that it can trust device A's identity. If the signature is false, the PCS aborts the protocol. To prepare the RTT measurement, the PCS responds in communication step 412 with a pair of random numbers $R_1$ and $R_2$ that are encrypted using the public key of A, e.g. $K_{pub,A}(R_1 \| R_2)$. Thus, the PCS ensures that only A can obtain these numbers (hence the trust in A's identity). $R_1$ and $R_2$ will be used to start and stop the RTT measurement.

Device A decrypts the message and returns $R_1$ in communication step 413, after which the PCS returns a third random number $R_3$ in step 414. Upon receipt of $R_3$, device A immediately communicates $(R_2 \oplus R_3)$ to the PCS in communication step 415. The PCS measures the time between sending the random number $R_3$ and receiving the result $(R_2 \oplus R_3)$ as an estimate for the round-trip time.

The communication steps 412-415 can optionally be repeated in order to perform multiple round-trip time measurement, from which for example a minimum, average, and maximum round-trip time measurement could be computed, as well as the number of failed measurements. The number of repetitions may have been predetermined or may have been communicated in step 411.

After the PCS has verified that the returned value is indeed the expected value of $(R_2 \oplus R_3)$, it generates information $\text{RTT}_A$ comprising information on the round-trip time measurement(s). The information about the round-trip time measurement $\text{RTT}_A$ might thus comprise information about a single round-trip time measurement, but might also comprise (if multiple round-trip time measurements are taken) the minimum, average, and maximum round-trip times, and optionally the number of failed measurements.

The information $\text{RTT}_A$ might comprise the actual measured distance, but instead it could also comprise an answer to the question whether the distance is below a predetermined threshold, or below a threshold that is set by device A and for example communicated to the PCS in communication step 411. In the latter two cases the threshold should preferably be part of the proximity certificate.

Subsequently, the PCS generates a signed proximity certificate $\text{PCert}_A = \text{sign}_{PCS}(N_A \| ID_A \| \text{RTT}_A)$ comprising the identity of device A, $ID_A$, and the information about the round-trip time measurement(s) $\text{RTT}_A$. The certificate preferably also comprises the nonce $N_A$ if it was included in communication step 411. The proximity certificate is signed by the PCS with its secret key, and subsequently the signed proximity certificate is communicated in step 416 to device A as a proof of the round-trip time between PCS and device A. Preferably the device certificate of the PCS itself is also communicated to device A. This device certificate allows device A to verify the signature of the PCS certificate and subsequently to verify the check server signature of the proximity certificate.

An advantage of this protocol is that the PCS has to perform at most one private key operation, in addition to one public key operation for each measurement. This keeps the PCS as cheap as possible.

In a variation of this protocol, communication step 412 is not executed in the repeated measurements, but instead the first communication step 412 sends a seed of a random number generator (instead of individual random numbers in each of the communication steps 412).

Using the same round-trip time measurement protocol, device B is also able to obtain a proximity certificate for the distance between device B and the PCS. This is illustrated in steps 421-426. The proximity certificate retrieval protocol 421-426 may be executed before, after or during the protocol steps 411-416. Retrieving the proximity certificate(s) could be performed upon demand after the initiation 401-402 of the SAC protocol or as part of a stand-alone process requesting proximity certificates at regular intervals.

When both device A and device B have obtained their proximity certificate, they can continue the authentication and key exchange protocol (optionally, the protocol is started now if steps 401-402 are executed after instead of before steps 411-416/421-426). For this purpose, device A transmits to device B a message in step 403, that is preferably formatted according to the ISO/IEC 11770-3 standard. In addition to the mandatory fields (the identity $ID_A$, a key contribution $K_A$, and a nonce $N_1$), A includes the identity $ID_{PCS}$ of the PCS that it used for the RTT measurements, the round-trip time $\text{RTT}_A$ that is contained in a fresh proximity certificate, and identification $\text{RAI}_A$ (e.g. a generation or version number) of the revocation and authorization information that it has used to verify the certificate of device B. Device B responds with a similar message in step 404, and device A returns the nonce $N_2$ to device B in step 405.

Subsequently, both devices verify the format of the received message(s), and abort the protocol if anything is wrong. In addition, device A may ensure that device B has used the same PCS as it has itself to perform the RTT measurements. If anything is wrong, any of the devices may abort the protocol. Finally, device A (and/or device B) verifies that the combination of $\text{RTT}_A$ and $\text{RTT}_B$ complies to some criteria, such as that each is below a predetermined threshold, or that the sum is below a predetermined threshold. If that is not the case, device A (and/or device B) judges that the distance to B is too large, and aborts the protocol. When the secure link is established, any combination of $K_A$ and $K_B$ may be used to form a session key (e.g. use $K_A$ only, or use a hash of both).

In a variation of this embodiment the proximately check server comprises a wireless communication device (261) with a limited reach, such that only local devices provided with a compatible communication device (262) within the reach of the proximity check server (or devices connected to such a local device) will be able to obtain a proximity certificate or distance certificate. To strengthen the proximity check it is preferred that a different method of distance measurement such as a round-trip time measurement is also performed.

A second embodiment of the SAC-protocol comprising round-trip time measurements is illustrated using FIG. 4B. In this embodiment, a simplified round-trip time measurement is executed in steps 461-464 (respectively 471-474), while the remainder of the protocol is the same as in the first embodiment.

Step 461 equals the original step 411. In order to initiate the Round-Trip Time (RTT) measurement protocol, device A transmits in communication step 461 its certificate $\text{Cert}_A$, to identify itself to the PCS. The communication comprises preferably a random number $N_A$ (nonce), and optionally the requested number $M_A$ of measurements to the identified PCS. The nonce allows verification of freshness of the measurement results in the proximity certificate.

Subsequently, the PCS verifies that the received certificate has a valid KIC signature, so that it can trust device A's identity. If the signature is false, the PCS aborts the protocol. To perform the RTT measurement, the PCS responds in communication step 462 with a random number $R_1$. Upon receipt of $R_1$, device A signs the random number and returns it in communication step 463. The communication steps 462-463 can optionally be repeated in order to perform multiple round-trip time measurement, from which for example a minimum, average, and maximum round-trip time measurement could be computed, as well as the number of failed measurements. The number of repetitions may have been predetermined or may have been communicated in step 461.

After the measurements are performed, the PCS generates a signed proximity certificate $PCert_A = sign_{PCS}(N_A \| ID_A \| RTT_A)$ comprising the identity of device A, $ID_A$, and the information about the round-trip time measurement(s) $RTT_A$. The certificate preferably also comprises the nonce $N_A$ if it was included in communication step 461. The proximity certificate is signed by the PCS with its secret key, and subsequently the signed proximity certificate is communicated in step 464 to device A as a proof of the round-trip time between PCS and device A. Preferably the device certificate of the PCS itself is also communicated to device A.

The remainder of this protocol is as described under the first embodiment.

FIG. 5 illustrates a third embodiment of the SAC-protocol comprising round-trip time measurements. In this third embodiment public key cryptography is used by device A and device B, whereas the PCS uses only symmetric cryptography. The protocol is the same as described before, except for steps 411-416 (and 421-426) which are replaced by steps 511-518 (and 521-528), and except for the need of additional steps 505-508.

In order to initiate the Round-Trip Time (RTT) measurement protocol, device A transmits in communication step 511 a nonce $N_1$, and optionally the requested number $M_A$ of measurements to the identified PCS. Subsequently, the PCS returns it identification $ID_{PCS}$ in step 512. Device A uses $ID_{PCS}$ to search its key block for a key $K_{root}$, which it shares with PCS. Device A may share different keys with different PCS's. The PCS may therefore share different keys with different devices. In step 513 device A returns $K_{root}(ID_A) \| j \| K_{PCS,j}(K_{root})$ comprising its identification $ID_A$, encrypted using the root key, and the root key itself, encrypted in the j-th device key $K_{PCS,j}$ of PCS. It is assumed that $K_{root}(ID_A)$ contains sufficient redundancy for PCS to determine that it has received the correct $ID_A$. For example, the e.g. 40 bits of $ID_A$ are supplemented by a known value to complete the block size of the encryption algorithm. In step 514 the PCS returns two random values, encrypted using the root key $K_{root}(R_1 \| R_2)$. Subsequently, device A returns, after decryption, the first random number $R_1$ in step 515 to signal that it is ready for a round-trip time measurement. The PCS sends a third random number in step 516, $R_3$, and starts a timer for the round-trip time measurement. Device A returns, upon receipt, immediately the exclusive-OR of $R_2$ and $R_3$, in step 517. The PCS stops the timer to complete the round-trip measurement and verifies that the result is as expected. Steps 514-517 may be repeated to collect statistics on the round-trip time. In step 518 the PCS returns the nonce $N_1$, information on the measured round-trip time(s) $RTT_A$, and a proximity certificate $PCert_A$, all encrypted using the root key. Inclusion of the nonce $N_1$ (included in the communication and encrypted by the root key, and optionally also included in the proximity certificate) also guarantees freshness of the proximity certificate, as the encryption format is chosen such that tampering with $N_1$ destroys the proximity certificate. The proximity certificate $PCert_A = K_{PCS}(N_1 \| ID_{PCS} \| ID_A \| RTT_A)$ contains the identity $ID_{PCS}$ of PCS, the identity $ID_A$ of device A, and information on the measured round-trip time(s) $RTT_A$. The proximity certificate is encrypted using a key that is unique to the PCS.

In steps 521-528 a similar protocol between device B and the PCS is executed.

When both device A and device B have obtained their proximity certificate, they can start or continue the authentication and key exchange protocol. Device A transmits to device B a message in step 503, that is preferably formatted according to the ISO/IEC 11770-3 standard, comprising the identity $ID_B$, a new nonce $N_B$, the identity $ID_A$ and a key contribution $K_A$ both encrypted with B's public key, the identity certificate of device B, and optionally the RAI. Device B responds with a similar message in step 504.

As the proximity certificate is encrypted with symmetric cryptography by the PCS for which the receiving device does not have the key, device A communicates the proximity certificate for device B to the PCS in step 505, together with a nonce $N_3$. The PCS verifies that it is the one that created the proximity certificate, and returns in step 506 the relevant information from the information together with the nonce $N_3$, all encrypted using the applicable root key, such that device A may decrypt and verify this information.

Subsequently, both devices verify the format of the received message(s), and abort the protocol if anything is wrong. In addition, device A may ensure that device B has used the same PCS as it has itself to perform the RTT measurements. If anything is wrong, any of the devices may abort the protocol. Finally, device A (and/or device B) verifies that the combination of information in $RTT_A$ and $RTT_B$ complies to some criteria, such as that each is below a predetermined threshold, or that the sum is below a predetermined threshold. If that is not the case, device A (and/or device B) judges that the distance to B is too large, and aborts the protocol. When the secure link is established, any combination of $K_A$ and $K_B$ may be used to form a session key (e.g. use $K_A$ only, or use a hash of both).

FIG. 6 illustrates a fourth embodiment of the SAC-protocol comprising round-trip time measurements with two different PCS's. Although this figure shows the same protocol used as in the first embodiment, the other protocols could also be used. The use of two different PCS's (PCS1 203 and PCS2 204), where PCS2 is similar to PCS1 but in a different location. These PCS's in two different locations allow more accurate determination of the location and/or distance of the two devices. In addition, the rule to be applied by device A and B must take into account that two PCS's are used, for example by having a table which combination(s) of PCS's are allowed.

FIG. 7 illustrates a fifth embodiment of the SAC-protocol comprising round-trip time measurements with two different PCS's, generating a distance certificate instead of a proximity certificate. In this embodiment, the PCS's perform a round-trip time measurement protocol in steps 701-703 (or more steps for the more sophisticated versions of the round-trip time measurement protocols), to determine the distance between the PCS's. If this distance is known because the PCS's are located at fixed locations, or because the locations of the PCS's inherently define the regions in which the devices are allowed to be located (regardless of the actual distance between the devices), these steps may be skipped.

In steps 704 PCS1 communicates the distance between PCS1 and device A to PCS2, allowing PCS2 to compute the distance between device A and device B. Instead of a proximity certificate, a distance certificate is returned in step 426, specifying information about the distance (for example, the distance itself, or only whether it is below a certain threshold).

Step 705 operates as 704 but in opposite direction. In some applications only one of the steps 704 and 705 needs to be performed.

Alternatives are possible, including combination of features from different claims. In the description above, "comprising" does not exclude other elements or steps, "a" or "an" does not exclude a plurality, and a single processor or other unit may also fulfill the functions of several means recited in the claims.

The invention claimed is:

1. A method for determining a level of allowed communication between a first device and a second device, comprising the acts of:

performing, using a trusted first proximity check server, a communication protocol with the first device to reliably determine a first distance between the trusted first proximity check server and the first device, the first device generating and transmitting a first identity certificate to identify itself to the trusted first proximity check server, the first identity certificate comprising a random number and KIC signature, the trusted first proximity check server verifying the first identity certificate received from the first device and generating a first proximity certificate comprising the first determined distance, the identity of the first device, and a nonce;

performing, using a trusted second proximity check server, a communication protocol with the second device to reliably determine a second distance between the trusted second proximity check server and the second device, the second device generating and transmitting a second identify certificate to identify itself to the trusted second proximity check server, the identity certificate comprising a random number and KIC signature, the trusted second proximity check server verifying the second identity certificate received from the second device and generating a second proximity certificate comprising the second determined distance, the identity of the second device, and a nonce, wherein the trusted first and second proximity check servers are either the same proximity check server or different proximity check server, wherein the first and second device perform an authentication and key exchange protocol;

determining, using the first device, whether the first determined distance from the first proximity certificate and second determined distance from the second proximity certificate satisfy a predetermined rule, the predetermined rule being distance requirements related to the first and second devices; and determining, using the first device, the level of allowed communication in dependence on whether the predetermined rule is satisfied, wherein the first proximity certificate comprises information when the first distance was determined.

2. The method as claimed in claim 1, wherein the first distance is determined by the trusted first proximity check server by measuring a round-trip time in the communication protocol.

3. The method as claimed in claim 1, wherein the trusted first proximity check server and the trusted second proximity check server are the same trusted proximity check server.

4. The method as claimed in claim 1, wherein the predetermined rule is satisfied only if a sum of the first determined distance and the second determined distance and a distance between the trusted first and second proximity check servers is below a predetermined threshold.

5. The method as claimed in claim 1, wherein the predetermined rule is satisfied if the first determined distance and the second determined distance are both below predetermined thresholds.

6. The method as claimed in claim 1, wherein additional trusted proximity check servers are used.

7. The method as claimed in claim 1, wherein the trusted first proximity check server is located at a distribution point in the network comprising the first and second devices and the trusted first and second proximity check servers.

8. The method as claimed in claim 1, wherein a challenge response protocol to determine the first distance between the first device and the trusted first proximity check server is part of an authentication protocol between the first device and the trusted proximity check server.

9. The method as claimed in claim 1, wherein said method further comprises the acts of:

the first device requesting the first proximity certificate from the trusted first proximity check server;

the second device requesting the second proximity certificate from the trusted second proximity check server; and the first device communicating the first proximity certificate to the second device, and the second device verifying whether the first determined distance from the first proximity certificate and the second determined distance from the second proximity certificate satisfy the predetermined rule.

10. The method as claimed in claim 1, wherein said method further comprises the acts of:

the second device requesting the first proximity certificate from the trusted first proximity check server;

the second device requesting the second proximity certificate from the trusted second proximity check server; and the second device verifying whether the first determined distance from the first proximity certificate and the second determined distance from the second proximity certificate satisfy the predetermined rule.

11. The method as claimed in claim 1, wherein the first device adds a random number in requesting the first proximity certificate from the trusted first proximity check server, the trusted proximity check server adds the random number to the first proximity certificate in generating the proximity certificate, and the first device verifies whether the distance certificate was created after the request of the distance certificate was made based on presence of the random number in the distance certificate.

12. The method as claimed in claim 1, wherein said method further comprises the acts of:

the trusted first proximity check server determining a distance between first device and the second device based on the determined distance between the trusted first proximity check server and the first device and the distance between the trusted second proximity check server and the second device, and the trusted first proximity check server generating a distance certificate comprising the determined distance between the first device and the second device.

13. The method as claimed in claim 12, wherein said method further comprises at least one of the first device and the second device performing the acts of:

requesting the distance certificate for the distance between the first and the second device from the trusted first proximity check server, retrieving the distance certificate from the trusting first proximity check server, verifying whether the distance between the first and the second device in the distance certificate from the trusted first proximity check server is below a predetermined threshold.

14. The method of claim 13, wherein in response to the requesting act, the method further comprises the acts of:
determining by the trusted first proximity check server whether the distance certificate is valid, and if not, then perform distance measurements to generate a valid distance certificate.

15. The method as claimed in claim 12, wherein said method further comprises at least one of the first device and the second device performing the acts of:
requesting the trusted first proximity check server to verify the determined distance between the first and the second device against a predetermined threshold, to which the trusted first proximity check server generates an answer to this request, retrieving the answer from the proximity check server.

16. The method as claimed in claim 12, wherein:
the first device adds a random number requesting the distance certificate from the trusted first proximity check server,
the trusted first proximity check server adds the random number to the distance certificate in generating the distance certificate, and
the first device verifies whether the distance certificate was created after the request of the distance certificate was made based on presence of the random number in the distance certificate.

17. The method as claimed in claim 1, wherein the first and second distance determinations require a communication over a wireless link.

18. The method as claimed in claim 1, wherein: the first device requests the trusted first proximity check server to set up a connection between the first device and the second device,
the trusted first proximity check server sets up the connection if the distance from the trusted first proximity check server to the first device and the distance from the trusted second proximity check server to the second device satisfy the predetermined rule.

19. The method of claim 1, further comprising the acts of:
performing, using a trusted third proximity check server, a communication protocol with the first device to determine a third distance between the trusted third proximity check server and the first device; and
using the first distance and the third distance from the first device to the trusted first proximity check serve and the trusted third proximity check serve, respectively, to determine a location of the first device.

20. The method of claim 1, wherein the first device has a higher interest in guarding protection of content.

21. The method of claim 1, wherein the act of determining, using the first device, the level of allowed communication includes sharing of content between the first device and the second through the allowed communication if the predetermined rule is satisfied, and preventing exchange of the content between the first device and the second if the predetermined rule is not satisfied, and
wherein at least one of the first proximity certificate and the second proximity certificate includes a cryptographic signature used to determine that the allowed communication is authentic and has not been tampered with.

22. A trusted proximity check server for enabling determination of an allowed level of communication between a first device and a second device, comprising:

a transmitting configured to transmit messages during a communication protocol with at least one of the first device and the second device,
a receiver configured to receive messages during the communication protocol, a tamper-resistant processor configured to execute the communication protocol,
a tamper-resistant measuring device configured to measure a distance while executing the communication protocol;
said tamper-resistant processing processor being further configured to generate at least one of a distance certificate and a proximity certificate; and
tamper-resistant signing device configured to cryptographically sign the generate at least one of the distance certificate and the proximity certificate for determining a level of the allowed communication in dependence on whether a predetermined rule about distance requirements related to the first device and the second device is satisfied
wherein the proximity certificate comprises information when the distance was measured;
performing, using the trusted proximity check server, a communication protocol with the first device to reliably determine a first distance between the trusted proximity check server and the first device, the first device generating and transmitting a first identity certificate to identify itself to the trusted proximity check server, the first identity certificate comprising a random number and KIC signature, the trusted proximity check server verifying the first identity certificate received from the first device and generating a first proximity certificate comprising the first determined distance, the identity of the first device, and a nonce; and
performing, using the trusted proximity check server, a communication protocol with the second device to reliably determine a second distance between the trusted proximity check server and the second device, the second device generating and transmitting a second identity certificate to identify itself to the trusted proximity check server, the second identity certificate comprising a random number and KIC signature, the trusted proximity check server verifying the second identity certificate received from the second device and generating a second proximity certificate comprising the second determined distance, the identity of the second device, and a nonce.

23. The trusted proximity check server as claimed in claim 22, wherein said trusted proximity check server further comprises tamper-resistant estimation device configured to estimate a distance based on a round-trip time.

24. The trusted proximity check server as claimed in claim 22, wherein the trusted proximity check server is integrated in a network device.

25. The trusted proximity check server as claimed in claim 22, wherein the proximity check server is implemented as a dongle.

26. The trusted proximity check server of claim 22, wherein the tamper-resistant signing device is further configured to allow sharing of content between the first device and the second through the allowed communication if the predetermined rule is satisfied, and preventing exchange of the content between the first device and the second if the predetermined rule is not satisfied, and
wherein the proximity certificate includes a cryptographic signature used to determine that the messages are authentic and have not been tampered with.

27. A system for determining a level of allowed communication between a first device and a second device, the system comprising:

the first device, wherein the first device determines the level of allowed communication in dependence of whether a predetermined rule was satisfied, said predetermined rule relating to distances requirements regarding said first and second devices;

the second device;

a trusted first proximity check server for performing a communication protocol with the first device to reliably determine a first distance between the first proximity check server and the first device, the first device generating and transmitting a first identity certificate to identify itself to the trusted first proximity check server, the first identity certificate comprising a random number and KIC signature, the trusted first proximity check server verifying the first identity certificate received from the first device and the first proximity check server generating a first proximity certificate comprising the first determined distance, the identity of the first device, and a nonce; and a trusted second proximity check server for performing a communication protocol with the second device to reliably determine a second distance between the second proximity check server and the second device, the second device generating and transmitting a second identity certificate to identify itself to the trusted second proximity check server, the identity certificate comprising a random number and KIC signature, the trusted second proximity check server verifying the second identity certificate received from the second device and the second proximity check server generating a second proximity certificate comprising the second determined distance, the identity of the second device, and a nonce, wherein the first and the second proximity check server are the same proximity check server or different proximity check servers, wherein the first and second devices perform an authentication and key exchange protocol, wherein the first device determines whether the first determined distance from the first proximity certificate and the second determined distance from the second proximity certificate satisfy the predetermined rule, wherein the first proximity certificate comprises information when the first distance was determined.

28. The system as claimed in claim 27, wherein at least one of the first device and the second device is implemented as a software application running on a programmable device.

29. A non-transitory computer-readable storage medium having stored thereon a computer program for enabling determination of an allowed level of communication between a first device and a second device, for use with a trusted first proximity check server and a trusted second proximity server, said computer program having computer executable instructions for causing a respective programmable device of the trusted first an second proximity check server to:

perform, by the trusted first proximity check server, a communication protocol with a first device to reliably determine a first distance between the trusted first proximity check server and the first device, the first device generating and transmitting a first identity certificate to identify itself to the trusted first proximity check server, the first identity certificate comprising a random number and KIC signature, the trusted first proximity check server verifying the first identity certificate received from the first device and the first proximity check server generating a first proximity certificate comprising the first determined distance, the identity of the first device, and a nonce, perform, by the trusted second proximity check server, a communication protocol with the second device to reliably determine a second distance between the trusted second proximity check server and the second device, the second device generating and transmitting a second identity certificate to identify itself to the trusted second proximity check server, the identity certificate comprising a random number and KIC signature, the trusted second proximity check server verifying the second identity certificate received from the second device and generating a second proximity certificate comprising the second determined distance, the identity of the second device, and a nonce, and enabling the first device to determine whether the first determined distance in the first proximity certificate and the second determined distance in the second proximity certificate satisfy a predetermined rule, said predetermined rule relating to distances requirements regarding said first and second devices, and to determine the level of allowed communication in dependence of whether the predetermined rule was satisfied, wherein the first proximity certificate comprises information when the first distance was determined.

30. A non-transitory computer-readable storage medium having stored thereon a computer program for enabling determination of an allowed level of communication between a first device and a second device, for use with a trusted first proximity check server and a trusted second proximity check server, said computer program having computer executable instructions for causing a programmable device to perform:

requesting a first proximity certificate from the trusted first proximity check server for the first device, the first device generating and transmitting a first identity certificate to identify itself to the trusted first proximity check server, the first identity certificate comprising a random number and KIC signature, the trusted first proximity check server verifying the first identity certificate received from the first device and said first proximity certificate containing a first determined distance between the trusted first proximity check server and the first device, the identity of the first device, and a nonce, requesting a second proximity certificate from at least one of the second device and the first the trusted second proximity check server for the second device, the second device generating and transmitting a second identity certificate to identify itself to the trusted second proximity check server, the identity certificate comprising a random number and KIC signature, the trusted second proximity check server verifying the second identity certificate received from the second device and said second proximity certificate containing a second determined distance between the trusted second proximity check server and the second device, the identity of the second device, and a nonce, determining whether the first determined distance in the first proximity certificate and the second determined distance in the second proximity certificate satisfy a predetermined rule, said predetermined rule relating to distances requirements regarding said first and second device, and determining the level of allowed communication in dependence of whether the rule was satisfied, wherein the first proximity certificate comprises information when the first determined distance was determined.

* * * * *